(12) United States Patent
Yoshimoto

(10) Patent No.: US 7,036,492 B2
(45) Date of Patent: *May 2, 2006

(54) SYSTEMS AND METHODS FOR CONDITIONING OR VAPORIZING LIQUID FUEL IN AN INTERMITTENT COMBUSTION ENGINE

(75) Inventor: Hitoshi Yoshimoto, 35 Matsugasaki Sakuragi-Cho, Sakyo-Ku, Kyoto 606-0902 (JP)

(73) Assignee: Hitoshi Yoshimoto, Kyoto (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/931,275

(22) Filed: Aug. 30, 2004

(65) Prior Publication Data

US 2005/0103307 A1 May 19, 2005

Related U.S. Application Data

(63) Continuation-in-part of application No. 10/229,928, filed on Aug. 28, 2002, now Pat. No. 6,782,875.

(60) Provisional application No. 60/316,011, filed on Aug. 29, 2001.

(51) Int. Cl.
*F02M 31/18* (2006.01)

(52) U.S. Cl. ................ 123/536; 123/538; 123/298

(58) Field of Classification Search ........... 123/798, 123/536, 537, 538, 543, 549, 557, 590, 298; 60/776, 39.821

See application file for complete search history.

(56) References Cited

U.S. PATENT DOCUMENTS

| | | | |
|---|---|---|---|
| 4,005,683 A | 2/1977 | Whitt | 123/25 B |
| 4,313,411 A * | 2/1982 | Moriyama et al. | 123/590 |
| 4,556,020 A | 12/1985 | Hickling | 123/536 |
| 4,672,938 A | 6/1987 | Hoppie et al. | 123/538 |
| 4,726,336 A | 2/1988 | Hoppie et al. | 123/537 |
| 5,027,764 A | 7/1991 | Reimann | 123/536 |
| 5,361,737 A | 11/1994 | Smith et al. | 123/143 B |
| 5,367,869 A | 11/1994 | DeFreitas | 60/39.06 |
| 5,404,712 A | 4/1995 | Few et al. | 60/39.82 |
| 5,515,681 A | 5/1996 | DeFreitas | 60/740 |
| 5,524,429 A * | 6/1996 | Few et al. | 60/776 |
| 5,598,699 A * | 2/1997 | Few et al. | 60/39.821 |
| 5,829,419 A | 11/1998 | Sadkin et al. | 123/538 |
| 5,845,480 A | 12/1998 | DeFreitas et al. | 60/39.06 |
| 5,983,871 A | 11/1999 | Gordon et al. | 123/536 |
| 6,581,581 B1 | 6/2003 | Bebich | 123/536 |
| 6,782,875 B1 * | 8/2004 | Yoshimoto | 123/536 |

FOREIGN PATENT DOCUMENTS

| | | |
|---|---|---|
| FR | 2666751 | 3/1992 |
| GB | 2185783 | 7/1987 |
| WO | WO98/51924 | 11/1998 |

* cited by examiner

*Primary Examiner*—Willis R. Wolfe, Jr.
(74) *Attorney, Agent, or Firm*—Thorpe North & Western

(57) ABSTRACT

A system and method for conditioning and/or vaporizing fuel within an intermittent combustion engine in order to effectuate more complete combustion is provided. In one embodiment of the invention, a fuel conditioning system for conditioning fuel within a combustion chamber of an intermittent internal combustion engine can comprise a fuel conditioning cavity defined by walls, wherein at least a portion of said walls include a reflective inner surface; an electromagnetic energy source operable for emitting electromagnetic energy within the fuel conditioning cavity, wherein the electromagnetic energy source is configured to emit and reflect the electromagnetic energy from the reflective inner surface, thereby providing focused electromagnetic energy; a discrete region disposed within the fuel conditioning cavity for receiving the focused electromagnetic energy; and a fuel injector having a dispensing end being oriented for dispensing a fuel spray with a trajectory through the focused electromagnetic energy.

50 Claims, 10 Drawing Sheets

SYSTEMS AND METHODS FOR CONDITIONING OR VAPORIZING LIQUID FUEL IN AN INTERMITTENT COMBUSTION ENGINE

The present application is a continuation-in-part of prior U.S. patent application Ser. No. 10/229,928, filed on Aug. 28, 2002, now U.S. Pat. No. 6,782,875, which claims the benefit of U.S. Provisional Patent Application No. 60/316,011, filed Aug. 29, 2001, each of which are incorporated herein by reference in their entireties.

FIELD OF THE INVENTION

The present invention relates to improving the emission quality and fuel mileage of intermittent combustion engines, such as reciprocating internal combustion engines, by introducing electromagnetic energy within a combustion chamber or pre-combustion chamber or cavity.

BACKGROUND OF THE INVENTION

In the reciprocating internal combustion engine, and other intermittent combustions engines, improved emissions and fuel mileage are areas of constant focus. One area where improvements can be made includes liquid fuel vaporization, particularly with respect to fuels such as gasoline and diesel fuels. For such fuels to be effective, the fuel should be converted from a liquid to a vapor, no matter how small a liquid fuel droplet is in size.

In order for a reciprocating engine to generate power, the fuel used must at least partially explode rather than burn slowly (as the engine combustion cycle is typically too short for a slowly burning liquid fuel to burn completely before the exhaust cycle begins). This is particularly a problem with the diesel engine, as the fuel is injected into the combustion chamber in liquid spray form, vaporized, and self-ignited in the same combustion cycle. Even under normal operating conditions, diesel fuel tends to self-ignite before being vaporized completely. Further, at cold start, the vaporization is even less complete, exacerbating problems associated with poor emissions. For example, soot can build up due to incomplete combustion of the fuel. Additionally, increased harmful exhaust results when the fuel is not completely consumed in the fuel combustion process.

Many of these problems can be solved and improved emissions can be effectuated if the fuel is essentially completely vaporized prior to ignition. However, conventional thermal heating of a fuel to a useful degree before injection is not desirable, as overheating of liquid fuel in the fuel line can cause vapor lock. Additionally, marginal heating to avoid vapor lock does not contribute significantly to an improvement in vaporization.

SUMMARY OF THE INVENTION

It has been recognized that it would be advantageous to develop a fuel conditioning system to increase the efficiency of intermittent combustion engines that use liquid fuels. Such intermittent combustion engines include, without limitation, reciprocating internal combustion engines, rotary or Wankel engines (WRCE), pulse detonation engines (PDE), or the like.

The invention provides fuel conditioning systems and methods for conditioning and igniting fuels for more complete combustion, all of which utilize functional electromagnetic energy to effectuate a more complete combustion. Fuels for which these technologies can be used include gasolines, diesel fuels, oils, alcohols, biodiesels, other alternative liquid fuels, or the like.

Specifically, a fuel conditioning system for conditioning fuel within a combustion chamber of an intermittent internal combustion engine can comprise a fuel conditioning cavity defined by walls, wherein at least a portion of the walls include a reflective inner surface; an electromagnetic energy source operable for emitting electromagnetic energy within the fuel conditioning cavity, wherein the electromagnetic energy source is configured to emit and reflect the electromagnetic energy from the reflective inner surface, thereby providing focused electromagnetic energy; a discrete region disposed within the fuel conditioning cavity for receiving the focused electromagnetic energy; and a fuel injector having a dispensing end being oriented for dispensing a fuel spray with a trajectory through the focused electromagnetic energy.

In another embodiment, a fuel conditioning system for conditioning fuel within a combustion chamber of an intermittent internal combustion engine can comprise a fuel conditioning cavity defined by walls, wherein at least a portion of the walls include a reflective inner surface; an electromagnetic energy source operable for emitting electromagnetic energy having wavelengths from 0.4 µm to 2 3 mm within the fuel conditioning cavity, wherein the electromagnetic energy source is configured to emit and reflect the electromagnetic energy from the reflective inner surface, thereby forming reflected energy; a discrete region disposed within the fuel conditioning cavity for receiving the reflected energy at a greater concentration than in other regions within the fuel conditioning cavity; and a fuel injector having a dispensing end being oriented for dispensing a fuel spray with a trajectory through the discrete region.

In still another embodiment, a fuel conditioning system for conditioning fuel within a combustion chamber of an intermittent internal combustion engine can comprise a combustion chamber defining a combustion region; a fuel conditioning region within or attached next to the combustion region, and having a volume size that is less than that of the combustion region; a fuel injector configured to eject a fuel spray along a trajectory through the fuel conditioning region; and an electromagnetic energy source configured to introduce focused electromagnetic energy into the fuel conditioning region.

In a related embodiment, a method for conditioning fuel for use in an intermittent combustion engine can comprise steps of injecting liquid fuel into a fuel conditioning cavity to form a fuel spray; emitting electromagnetic energy into the fuel conditioning cavity; and reflecting the electromagnetic energy from a reflective surface, wherein the electromagnetic energy becomes focused at the fuel spray.

Additional features and advantages of the invention will be apparent from the detailed description which follows, taken in conjunction with the accompanying drawings, which together illustrate, by way of example, features of the invention.

DESCRIPTION OF THE DRAWINGS

In the accompanying drawings which illustrate embodiments of the invention.

DETAILED DESCRIPTION OF THE PREFERRED EMBODIMENT(S)

Figure 1:
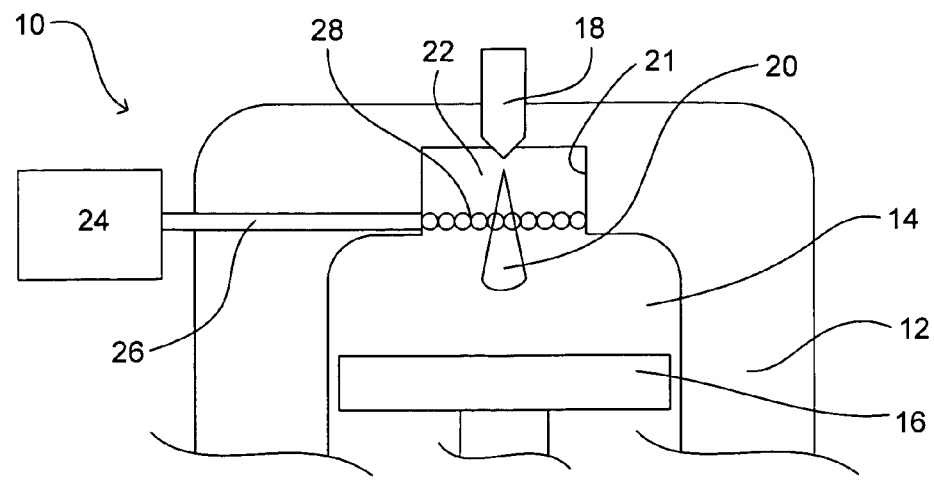
FIG. 1 is a schematic drawing of a fuel conditioning or vaporization system for delivering substantially vaporized fuel to a combustion chamber of an intermittent combustion engine.

Before the present invention is disclosed and described, it is to be understood that this invention is not limited to the particular structures, process steps, and materials disclosed herein as such process steps and materials may vary to some degree. It is also to be understood that the terminology used herein is used for the purpose of describing particular embodiments only and is not intended to be limiting, as the scope of the present invention will be limited only by the appended claims and equivalents thereof.

It must be noted that, as used in this specification and the appended claims, the singular forms "a," "an," and "the" include plural referents unless the content clearly dictates otherwise.

"Volumetric heating" or "volumetric vaporization" includes the use of electromagnetic energy to condition and/or vaporize fuel droplets throughout its volume, preferably essentially simultaneously. This is in contrast to conventional surface heating via conduction and convection. Volumetric heating can occur by achieving molecular resonant absorption, though this is not required. Complete vaporization is not required, though a more complete vaporization can result in a cleaner running engine.

"Electromagnetic wave" or "electromagnetic energy" includes any wavelength(s) of electromagnetic energy that is/are functional in accordance with embodiments of the present inventions. With respect to embodiments where a standing wave is created in a fuel conditioning cavity or combustion chamber, wavelengths that are comparable to the general size of the fuel conditioning cavity are preferred. For example, as the typical fuel conditioning cavity size can be around a few centimeters ("cm"), i.e., from about 2 to 10 cm, a preferred wavelength can be from 0.1 mm to about 10 cm, though wavelengths from 0.1 mm to about 2 mm can be preferred in certain embodiments. In embodiments where electromagnetic energy is reflected from a fuel conditioning cavity or combustion chamber reflective surface, such as a wall, and is focused at a remote location within a discrete portion of the cavity or chamber, wavelengths much shorter than the general cross-sectional size of the fuel conditioning cavity (about one fifth or less) can be used. For example, wavelengths from about 0.1 µm to about 2 mm can be used. This being stated, wavelengths ranging from visible light through infrared and up to about 2 mm are particularly preferred for use, i.e., about 0.4 µm to about 2 mm.

The term "discrete region" when referring to an area of space within a fuel conditioning cavity or combustion chamber is smaller than the entire region of the cavity or chamber, respectively.

The term "focus" or "focused" when referring to electromagnetic energy refers to a point or area where waves of electromagnetic energy are moving towards one another, up to and including at the diffraction limit. Typically, as a fuel spray is wider than the diffraction limit of the electromagnetic energy used, and as wider focusing areas can cause liquid fuel vaporization, the term "focus" or "focused" does not require that the energy be completely diverged. In other words, though within the scope of the present invention, complete focusing to the point of reaching the diffraction limit may be less desirable than focusing to a larger size. Focusing to a larger size than the diffraction limit can be carried out by using distorted reflective surfaces, non-collimated beams, or other techniques known in the art.

Reference will now be made to the exemplary embodiments illustrated in the drawings, and specific language will be used herein to describe the same. It will nevertheless be understood that no limitation of the scope of the invention is thereby intended. Alterations and further modifications of the inventive features illustrated herein, and additional applications of the principles of the inventions as illustrated herein, which would occur to one skilled in the relevant art and having possession of this disclosure, are to be considered within the scope of the invention.

Referring now to FIG. 1, a fuel conditioning system 10 for use with an intermittent combustion engine for enhancing fuel efficiency is shown. The fuel conditioning system 10 generally comprises a combustion chamber wall 12 defining a combustion chamber 14, a piston head 16, and a fuel conditioning cavity wall 21 defining a fuel conditioning cavity 22. The fuel conditioning cavity in this embodiment is fluidly coupled to the combustion chamber 14. In one embodiment, the cavity wall 21 of fuel conditioning cavity 22 can be, at least in part, comprised of a material that acts as an optical mirror. Thus, a surface for reflecting electromagnetic waves 28, once introduced into the fuel conditioning cavity, can be provided. In another embodiment, the fuel conditioning cavity can be the combustion chamber per se.

In reciprocating internal combustion embodiments, a fuel injector 18 is also shown which can be configured to introduce a fuel spray 20 at appropriate times in conjunction with the cyclic movement of the piston head, as is known by those skilled in the art. The fuel spray contains fuel spray droplets, each having a fuel molecular absorption resonant frequency. If the cylinder is for a gasoline engine, then a spark is required to ignite the vaporized fuel spray. However, for a diesel engine, no spark is required to ignite the vaporized fuel spray. As in most diesel engines, from one to eight (or even more) fuel injector nozzles can be positioned radially in a single cylinder as is known by those skilled in the art. In the context of the present invention, each injector nozzle can be placed in its own fuel conditioning cavity. With any fuel type, the fuel conditioning cavity 22 can be positioned such that the fuel spray 20 passes through the fuel conditioning cavity 22 before entering the combustion chamber 14. In alternative embodiments, the design shown can be modified for use in other types of intermittent combustion engines, such as rotary engines or pulse detonation engines (PDE), for example.

An electromagnetic energy source 24 is also shown which is configured to introduce appropriate electromagnetic waves 28 into the fuel conditioning cavity 22. The electromagnetic energy source 24 is configured to emit an electromagnetic energy with a wavelength suitable for volumetrically heating fuel drops in the fuel conditioning cavity 22. Though volumetric heating can be carried out in accordance with an embodiment of the present invention, any heating step that causes rapid vaporization of a fuel spray can be used. An electromagnetic wave channeling device 26, such as a waveguide, laser, optical fiber, nonlinear optical device such as periodically poled lithium niobate device (PPLN), or other device, or any combination of the above can be used to couple the electromagnetic waves to the fuel conditioning cavity 22.

In an alternative embodiment, the fuel conditioning cavity 22, electromagnetic waves or energy 28, and the molecular absorption resonant frequency of the fuel can be configured to provide conditions such that the emitted electromagnetic waves 28 can form an electromagnetic standing wave. In other embodiments, electromagnetic energy that does not form a standing wave can be used. Additionally, the wavelength of the electromagnetic energy can be selected such that molecular rotational and/or vibrational absorption occurs within the fuel droplets as the fuel spray 20 passes through the standing electromagnetic wave, or other electromagnetic energy pattern. Thus, the fuel conditioning cavity 22 and electromagnetic waves or energy 28 can be selected at a wavelength such that a standing wave can be created, while at the same time the electromagnetic waves are within a wavelength range to effectuate enough molecular rotational and/or vibrational absorption to promote volumetric heating of the fuel. Alternatively, wavelengths and amplitudes can be selected to otherwise heat the fuel spray to improve vaporization in accordance with other embodiments of the present invention.

In accordance with FIG. 1, the combustion chamber wall 12 can work as a heat sink and be comprised of heat conducting metal. A liquid coolant (not shown) can optionally be circulated along the exterior for cooling purposes. By making the fuel conditioning cavity a part of the cylinder wall bulk, excessive heating of the fuel conditioning cavity structure can be avoided.

Figure 2A:
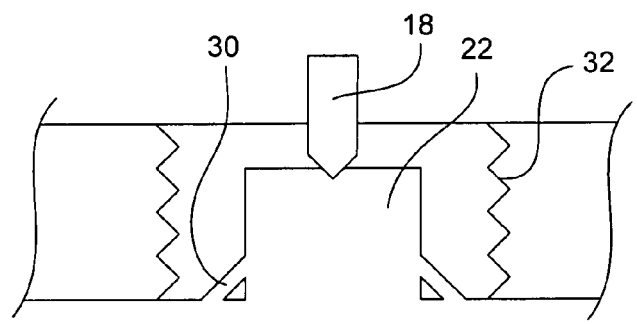
FIGS. 2a and 2b are schematic drawings as viewed in cross-section and from a bottom perspective, respectively, of a removable fuel conditioning or vaporizing system in accordance with principles of the present invention.
Figure 2B:
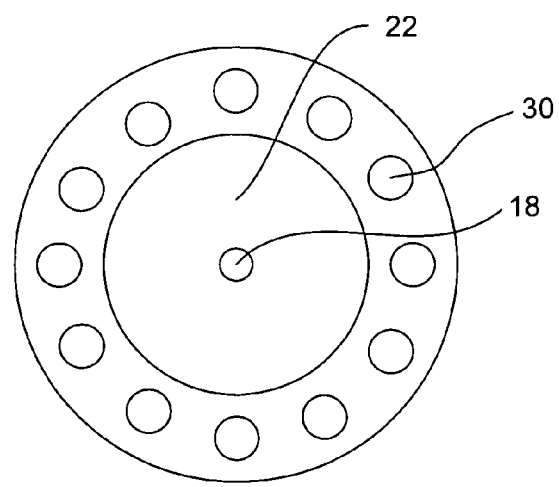

In FIGS. 2a and 2b, an alternative embodiment is shown in two views, i.e., a cross-sectional view (FIG. 2a) and a perspective bottom view from within the cylinder (FIG. 2b). The fuel injector 18 and the fuel conditioning cavity 22 correspond to FIG. 1. However, in this embodiment, two additional elements are present. First, a plurality of air holes or vents 30 is shown. More specifically, several radially configured air vents 30 (two shown in cross-section in FIG. 2a) are used to enhance the mixing of air and the fuel spray. However, other embodiments can be used to accommodate a similar result. For example, a suspended fuel conditioning cavity having mesh walls, or a fuel conditioning cavity embedded within the walls of an intermittent combustion engine having multiple air vents can be used. If air vents are added, the number and size can be configured to accommodate formation of a standing wave within the fuel conditioning cavity, or alternatively, can be configured to accommodate electromagnetic reflectance from a reflective wall surface. The size of air vents can be smaller than the wavelength in the embodiments where a standing wave is formed, but will likely be larger than the wavelength in embodiments where energy is reflected and concentrated, i.e., no standing waves formed due to very short wavelength compared to the dimension of the fuel conditioning cavity.

Additionally, FIG. 2a shows a removable fuel conditioning cavity embodiment where threads 32 have been incorporated around the cavity. Thus, the fuel conditioning cavity can be removed by screwing action (similar to the removal of a spark plug) if the fuel conditioning cavity is damaged, or for any other reason that may be necessary.

Figure 3A:
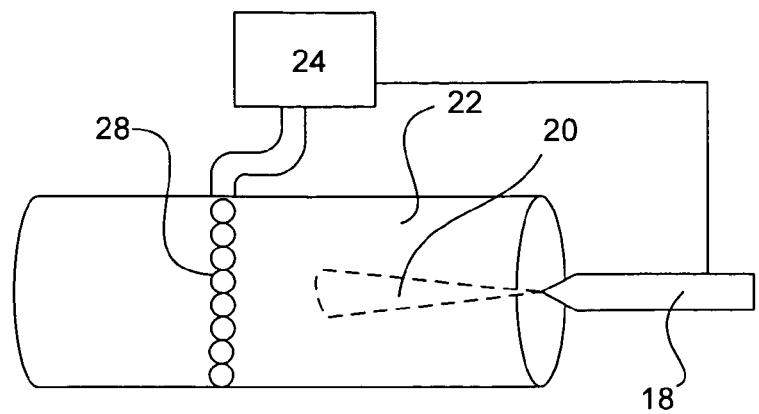
FIGS. 3a–c are schematic drawings showing an embodiment of an operational mode of the present invention.
Figure 3B:
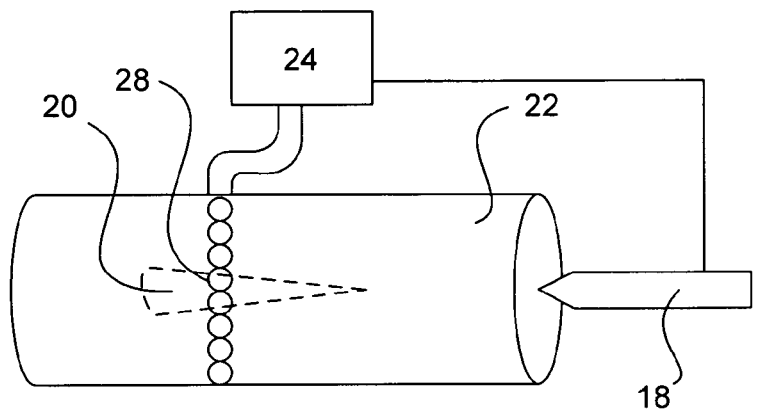
Figure 3C:
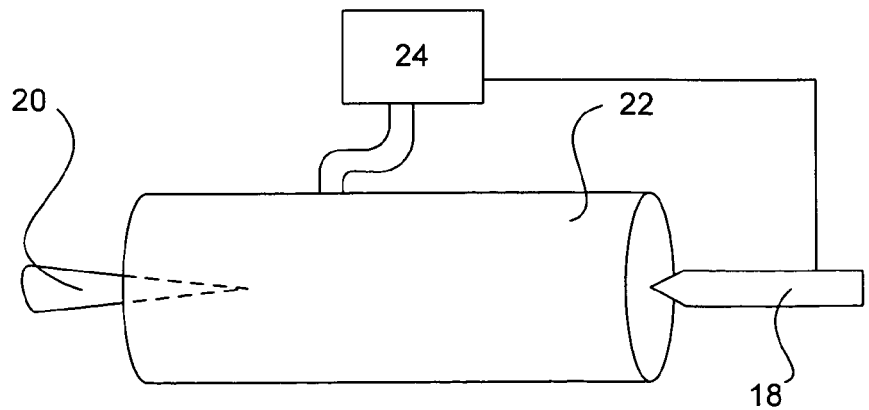

Turning now to FIGS. 3a–c, a method of the present invention is schematically represented. In FIG. 3a, stage 1 of the method is shown. In stage 1, both the generator 24 and the fuel injector 18 are in an active mode. Thus, the electromagnetic waves 28 are either being emitted/reflected, or are in the form of a standing wave within the cavity when the fuel spray 20 is being injected. In FIG. 3b, stage 2 is shown wherein the injector 18 is in an inactive mode. However, the fuel spray 20 is still present in the fuel conditioning cavity 22. Because the fuel spray is still in the fuel conditioning cavity, it is still in a position wherein the electromagnetic waves 28 can cause volumetric vaporization of the fuel spray 20.

Therefore, the electromagnetic waves 28 can continue to be emitted, reflected, and/or resonated after the fuel injector 18 has been deactivated. As shown in FIG. 3c, the fuel spray 20 is no longer present in the fuel conditioning cavity 22. As there is no need to continue to introduce the electromagnetic waves 28 into the fuel conditioning cavity, the electromagnetic waves can optionally be switched off until the next fuel spray cycle begins.

With the systems and methods described above, in circumstances where the electromagnetic wavelengths to be used are very short, e.g., visible light through infrared and up to about 2 mm, it can be difficult to create a standing wave in a relatively large fuel conditioning cavity with respect to the size of the wavelength. This is particularly true when the size of the fuel conditioning cavity (which can be the combustion chamber itself) is large enough for a fuel spray to pass through without significantly contacting the walls. Though the configuration of FIGS. 1–3 can be used for both shorter and longer wavelengths, there are other embodiments that can also be effective for concentrating shorter wavelength electromagnetic wave energy.

Figure 4A:
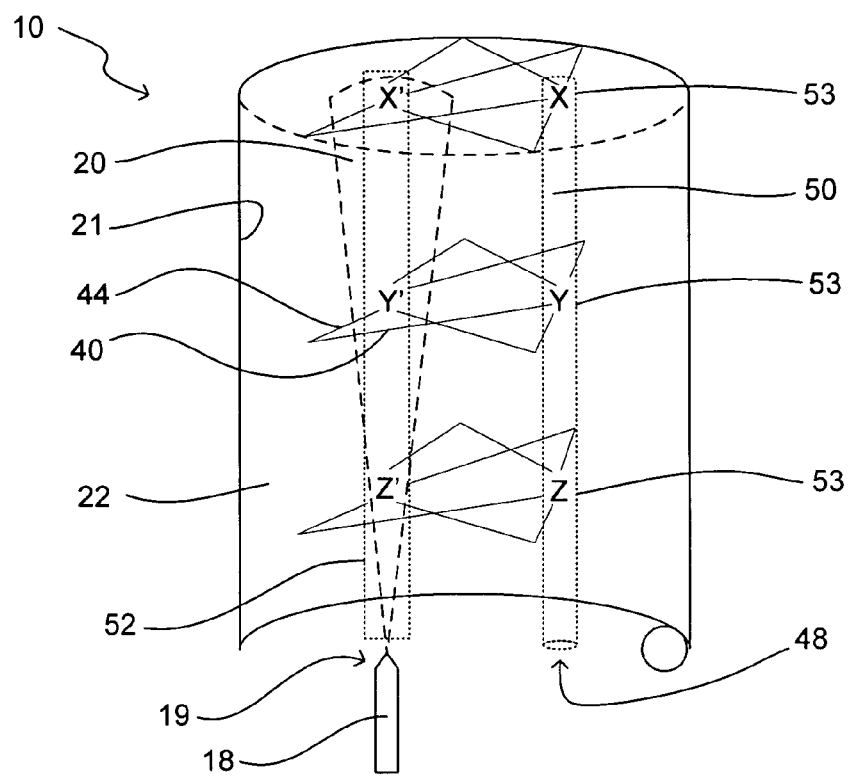
FIGS. 4a and 4b are inside perspective and side schematic views, respectively, of an alternative fuel conditioning system for substantially vaporizing fuel in a substantially elliptically cross-sectioned cavity of an intermittent combustion engine.
Figure 4B:
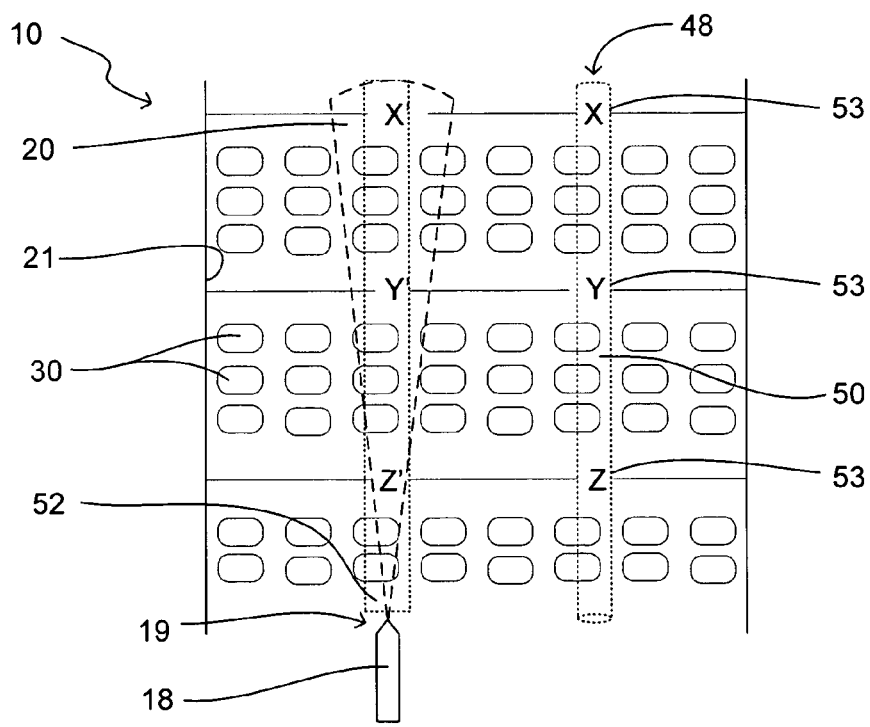

In FIGS. 4a and 4b, a fuel conditioning system 10 that comprises a fuel conditioning cavity 22 having an elliptical cross-section with respect to the trajectory of the fuel spray 20 is shown. In a more optimized system, the elliptical cross-section can be a mathematical ellipse having two focal points, X and X'. Such a fuel conditioning cavity 22 configuration can comprise two focal axes that pass through the two focal points of the cross-section. The fuel conditioning cavity 22 can be defined by fuel conditioning cavity walls 21 having a reflective inner surface. For example, the fuel conditioning cavity walls 21 can optionally comprise an optical mirror.

The electromagnetic energy source 50 is shown to be operable along a first axis, designated as the electromagnetic energy source axis 48 of the two focal axes, and the energy concentrating region 52, which can be a discrete region within the chamber, is disposed along a second axis of the two focal axes. The electromagnetic energy source 50 is operable within the fuel conditioning cavity 22, and is configured to emit electromagnetic energy toward the walls. The energy concentrating region 52 is disposed within the fuel conditioning cavity 22 and configured to receive reflected from the walls, thereby providing concentrated energy in the energy concentrating region 52 that is greater than in regions outside the energy concentrating region. In one embodiment, in addition to concentration, the electromagnetic radiation can become focused at the energy concentrating region.

The fuel conditioning cavity also comprises a fuel injector 18 having a dispensing end 19 configured for dispensing a fuel spray 20 with a trajectory through the energy concentrating region. In one embodiment, the electromagnetic energy source 50 can be configured to emit energy from several nodes 53 (points X, Y, and Z) along the electromagnetic energy source axis 48. Although only three such nodes 53 are illustrated, any number of nodes may be used. The reflective interior walls 21 can contain air vents 30 placed where the energy intensity is at a minimum. Preferably, the air vents 30 can be larger than about 100 µm to allow the desired air flow.

The shape of the cross section of the fuel conditioning cavity can be a mathematical ellipse such that the emitted electromagnetic energy 40 (e.g., from each node 53 along the source axis 48) reflects from the interior wall 21. Upon reflection, the electromagnetic energy 44 passes through or near the energy concentration region 52. By utilizing this principle, a fuel conditioning cavity can be designed wherein a millimeter wave, such as less than about 2 mm, or even shorter electromagnetic wave, can be focused or concentrated at a predictable location within the fuel conditioning cavity. Along the energy concentrating region 52, a fuel spray 20 can be injected from a fuel injector 18 such that the fuel can be volumetrically or otherwise vaporized as it passes through the energy concentrating region 52.

Suitable emitting sources can include slot antennas, patch antennas, dielectric rods, light emitting rods, light emitting devices, (half) mirrors, non-linear optical crystals, and/or any combination thereof. In one embodiment, the source may be configured to emit the electromagnetic waves perpendicular to its axis such that electromagnetic concentration can be maximized. Wavelengths can be used that correspond to molecular vibrational and/or rotational absorption frequencies such that volumetric vaporization can be enhanced, or can simply be chosen after routine experimentation where appropriate vaporization is noted to occur. Also, certain embodiments of the present invention benefit from improved efficiency of the vaporization process by using longer fuel conditioning cavities.

Though the embodiments of FIGS. 4a and 4b show a fuel conditioning cavity that has a mathematical ellipsoid cross-section, this is not the only functional shape. Any cross-sectional shape can be used, provided the electromagnetic energy source axis 48 and the energy concentrating region 52 can be configured for effective volumetric vaporization of a fuel spray. For example, a fuel conditioning cavity having a polygon cross-section can be used, provided enough concentrated energy can be focused along a fuel spray trajectory.

Figure 5A:
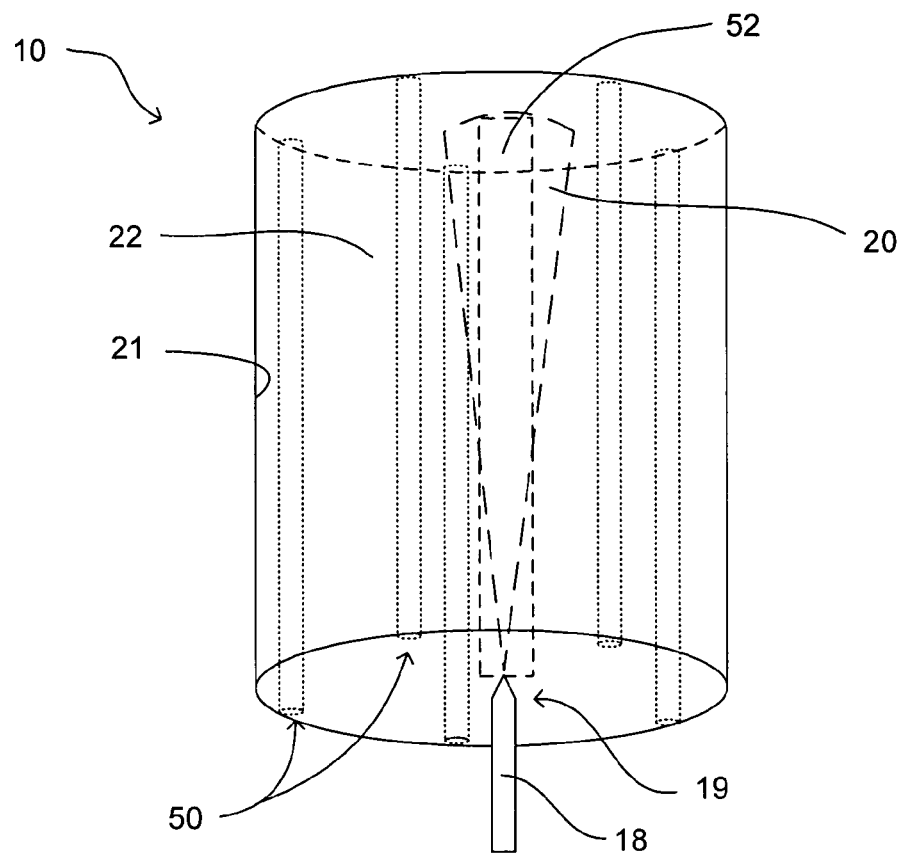
FIGS. 5a and 5b are inside perspective and bottom schematic views, respectively, of another alternative fuel conditioning system for substantially vaporizing fuel in an substantially cylindrical fuel conditioning cavity of a reciprocating internal combustion engine.
Figure 5B:
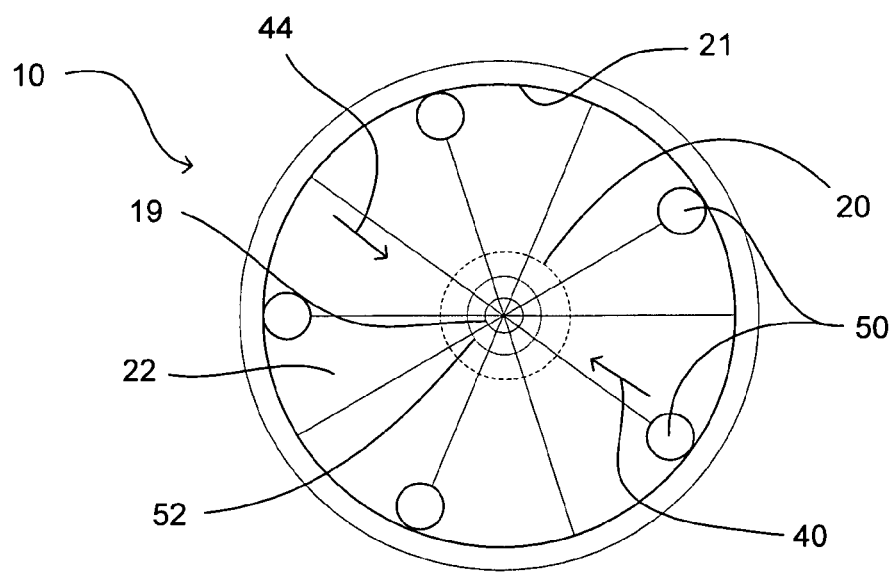

FIGS. 5a and 5b shows a fuel conditioning system 10 comprising a cylindrical fuel conditioning cavity 22 defined by reflective fuel conditioning cavity walls 21. In this embodiment, multiple electromagnetic energy emitting sources 50 are situated along the interior wall 21 of the cylindrical fuel conditioning cavity 22. The electromagnetic energy source 50 is operable within the fuel conditioning cavity, wherein the electromagnetic energy source is configured to emit electromagnetic energy toward the walls of the opposite side. As shown in FIG. 5b, the interior wall 21 can also be configured to reflect the electromagnetic energy at a position opposite the electromagnetic energy emitting source 50. Also, an energy concentrating region 52 is disposed along the center axis of the fuel conditioning cavity 22, wherein the electromagnetic energy is reflected from the walls to a central energy concentrating region 52, thereby providing greater energy at the energy concentrating region 52. Additionally, a fuel injector 18 having a dispensing end 19 configured for dispensing a fuel spray 20 with a trajectory through the energy concentrating region is disposed within the fuel conditioning cavity 22. Thus, in one embodiment, emitted electromagnetic energy 40 (e.g., from any point along each electromagnetic energy emitting source 50) can pass into or through the fuel spray 20, followed by reflected electromagnetic energy 44 from the interior wall 21 back through the fuel spray 20. Air vents (not shown) can be placed in the interior walls 21 between the electromagnetic energy emitting sources 50 and the reflective areas to avoid interference with the electromagnetic energy used to volumetrically vaporize the fuel droplets.

Figure 6A:
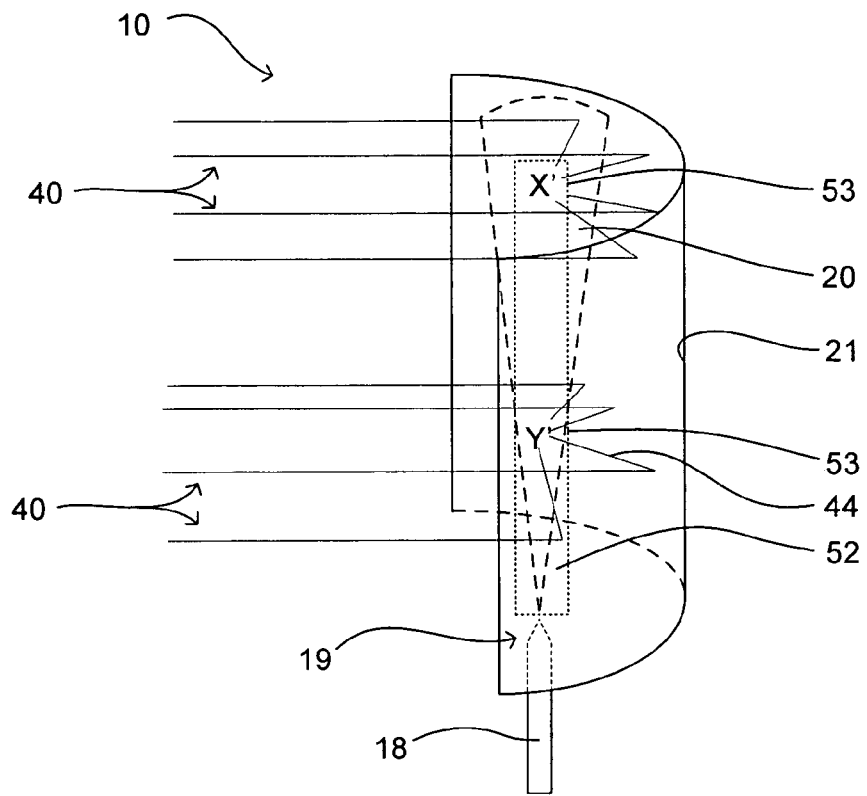
FIGS. 6a and 6b are inside perspective and bottom schematic views, respectively, of another alternative fuel conditioning system for substantially vaporizing fuel via substantially parabolic walls of a fuel cavity of an intermittent combustion engine.
Figure 6B:
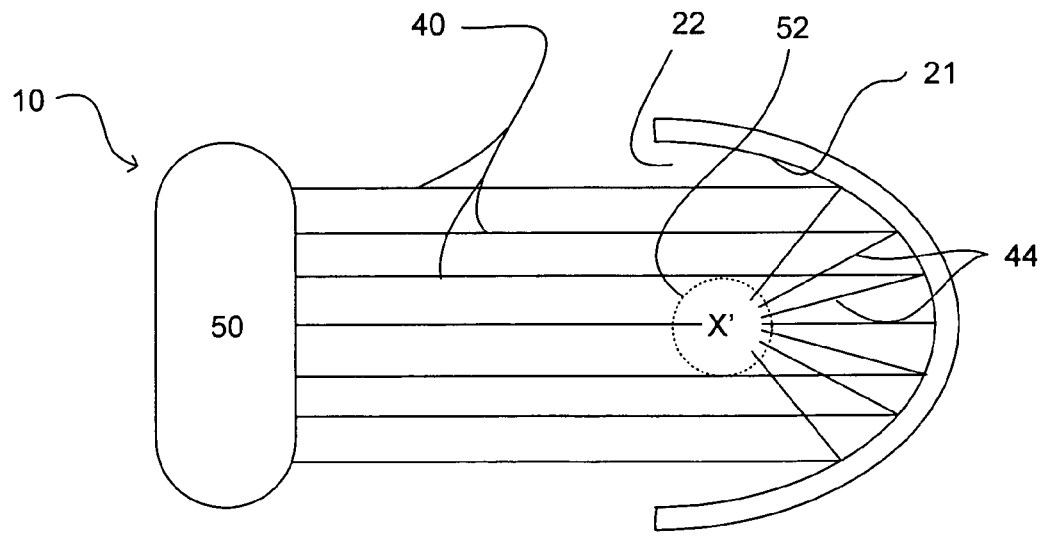

In FIGS. 6a and 6b, a fuel conditioning system 10 is shown that comprises a parabolically shaped fuel conditioning cavity 22 having a parabolic reflective wall surface 21. An electromagnetic energy source 50 is operable within the fuel conditioning cavity 22 and is configured to emit electromagnetic energy toward the walls 21. An energy concentrating region 52 is also disposed within the fuel conditioning cavity 22, wherein the electromagnetic energy is reflected from the walls 21 to the energy concentrating region 52, thereby providing concentrated energy in the energy concentrating region that is greater than in regions outside the energy concentrating region. Further, a fuel injector 18 having a dispensing end 19 is configured for dispensing a fuel spray 20 with a trajectory through the energy concentrating region 52.

In this embodiment, the electromagnetic energy emitting source 50 may be multiple single directional sources or a surface emitter, for example. Thus, the emitted electromagnetic energy or waves 40 are configured to reflect from interior walls 21 of or within the fuel conditioning cavity 22. Reflected electromagnetic energy 44 then passes through an energy concentrating region 52 (defined as transecting points X' and Y'), or through specific points or nodes (X' and/or Y', for example). In other words, as in previously described embodiments, the electromagnetic energy emitting source 50 may emit energy such that energy is concentrated continuously along the energy concentrating region 52, or at discreet nodes 53. Additionally, air vents (not shown) can be present as described previously. The fuel spray 20 can then be ejected from the dispensing end 19 such that the fuel passes through the energy concentrating region 52, thereby volumetrically vaporizing the fuel spray or droplets.

Figure 7A:
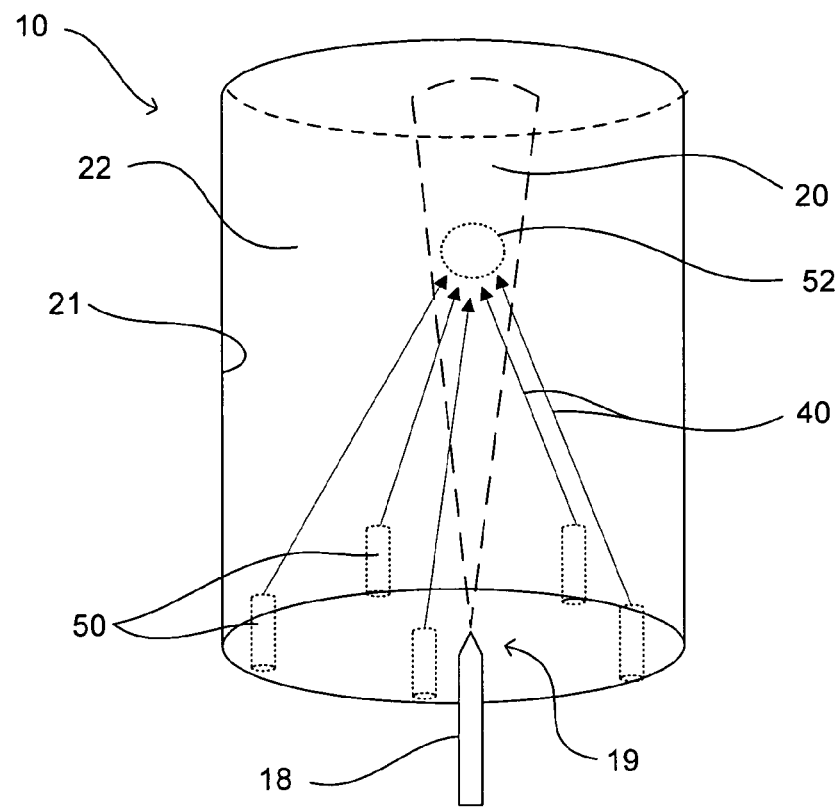
FIGS. 7a and 7b are inside perspective and bottom schematic views, respectively, of another alternative fuel conditioning system for substantially vaporizing fuel in an fuel conditioning cavity of an intermittent combustion engine.
Figure 7B:
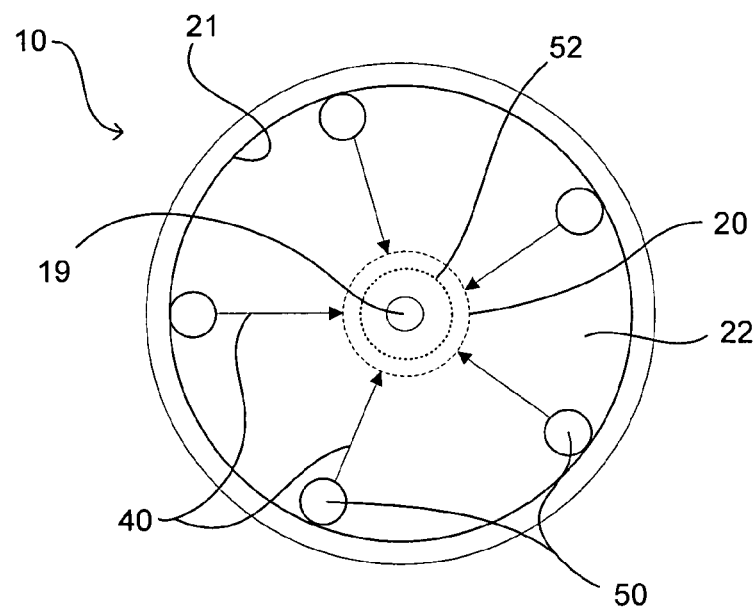

In FIGS. 7a and 7b, a fuel conditioning system 10 is shown that comprises an optional fuel conditioning cavity 22 defined by optional fuel conditioning cavity walls 21. In this embodiment, a separate fuel conditioning cavity is not present, as the electromagnetic energy 40 is not necessarily reflected from a wall to provide energy concentration. For example, the electromagnetic energy can be directed within a combustion chamber (not shown). A fuel injector 18 having a dispensing end 19 for ejecting a fuel spray 20 into the fuel conditioning cavity is also present wherein the fuel spray 20 has a predetermined trajectory. An electromagnetic energy source 50 can be configured for introducing electromagnetic energy into the fuel conditioning cavity 22 through the trajectory. The electromagnetic energy source 50 can further be configured to effectuate volumetric heating of fuel spray droplets ejected from the fuel injector 18. An energy concentrating region 52 can also be disposed within the optional fuel conditioning cavity 22. In this embodiment, the energy concentrating region 52 is configured for receiving a greater energy concentration from the electromagnetic energy source 50 than in regions outside the energy concentrating region.

In this embodiment, multiple electromagnetic energy emitting sources 50 can be situated radially around the fuel injector 18. Thus, the emitted electromagnetic energy or waves 40 are configured to pass through an energy concentrating region 52. In other words, as in previously described embodiments, the electromagnetic energy emitting source 50 may emit energy such that energy is concentrated continuously in the energy concentrating region 52, or intermittently concentrated according to fuel spray cycles. Additionally, air vents (not shown) can be present as described previously. The fuel spray 20 is therefore injected to pass through the energy concentrating region 52 such that the fuel can be volumetrically vaporized.

Figure 8A:
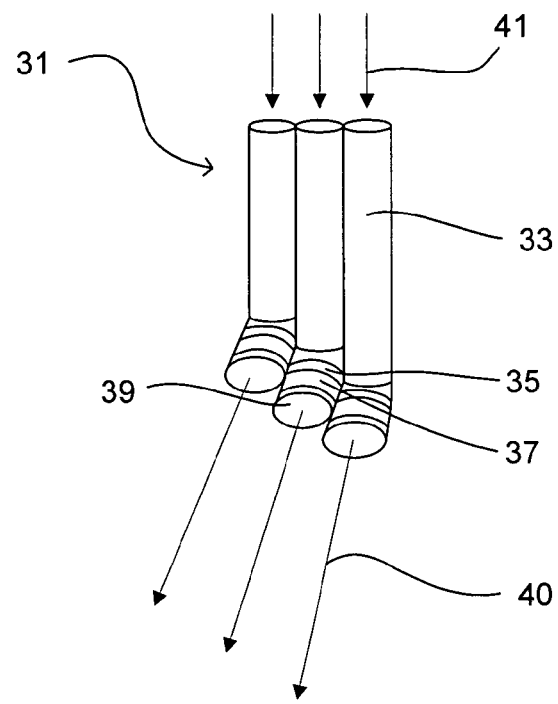
FIGS. 8a and 8b are perspective and side schematic views, respectively, of a periodically poled lithium niobate (PPLN) optical parametric oscillator that can be used to introduce electromagnetic energy into a fuel conditioning chamber of an intermittent combustion engine.
Figure 8B:
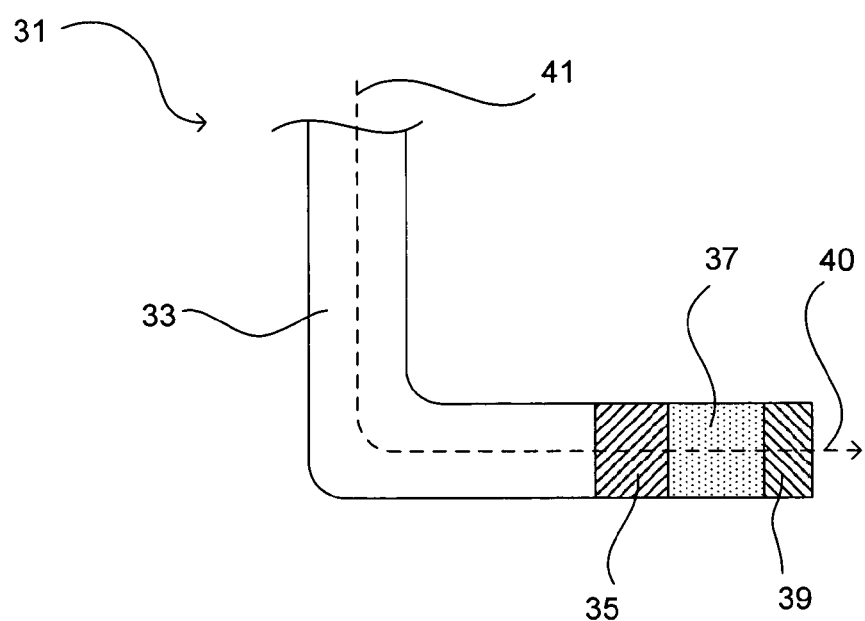

In FIGS. 8a and 8b, a periodically poled lithium niobate device configuration 31 is shown. These FIGS. are provided to describe one possible device configuration that can be used to introduce electromagnetic waves into a fuel conditioning chamber. The periodically poled lithium niobate device implementation can comprise an electromagnetic energy conduit 33, an optical coupler 35, a nonlinear wavelength converter 37, and a protective optical coupler 39. Initially, input electromagnetic energy 41 is introduced and conducted through the electromagnetic energy conduit 33 prior to entering and passing through the optical coupler 35. Next, the electromagnetic energy enters and passes through the PPLN 37. The electromagnetic energy then enters the protective optical coupler 39 before being emitted into a fuel conditioning cavity. After passing through the protective optical coupler 39, the energy is in the form of emitted electromagnetic energy 40. The periodically poled lithium niobate device can be used as the electromagnetic energy or wave source of any of the previously described embodiments.

Figure 9:
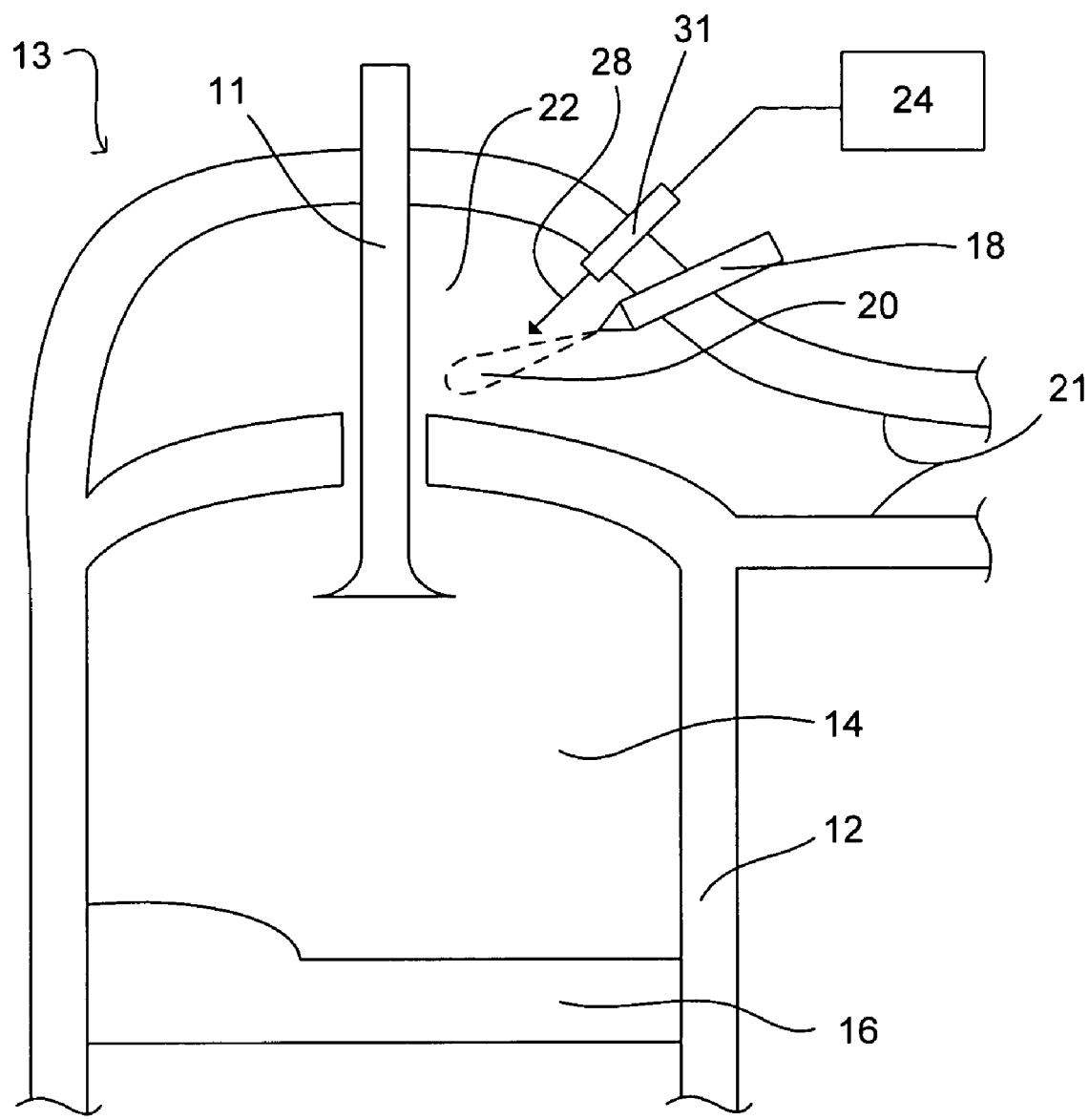
FIG. 9 is a schematic drawing of another alternative fuel conditioning system for substantially vaporizing fuel in an intermittent combustion engine with an indirect fuel injection system.

In FIG. 9, an embodiment of a fuel conditioning system for use with an indirect fuel injection reciprocating internal combustion engine 13 is shown. Such a fuel conditioning system generally comprises an intake valve 11, a combustion chamber wall 12 defining a combustion chamber 14, a piston head 16, and a fuel conditioning cavity wall 21 defining a fuel conditioning cavity 22, which is also the intake port (or intake manifold) in conventional engines. The fuel conditioning cavity wall 21 can optionally be configured for reflecting electromagnetic energy. A fuel injector 18 is also shown as well as a fuel spray 20 which is present at appropriate times in conjunction with the cyclic movement of the piston head, as is known by those skilled in the art. The fuel conditioning cavity 22 is present and is positioned such that the fuel spray 20 passes through the fuel conditioning cavity 22 before entering the combustion chamber 14. An electromagnetic energy source 24 is also shown which is configured to emit electromagnetic waves 28. A periodically poled lithium niobate device 31, for example, can be used to couple the electromagnetic waves to the fuel conditioning cavity 22. Although a periodically poled lithium niobate device is shown, any electromagnetic energy or wave source suitable for use in accordance with embodiments of the present invention can be used.

Figures 10A, 10B:
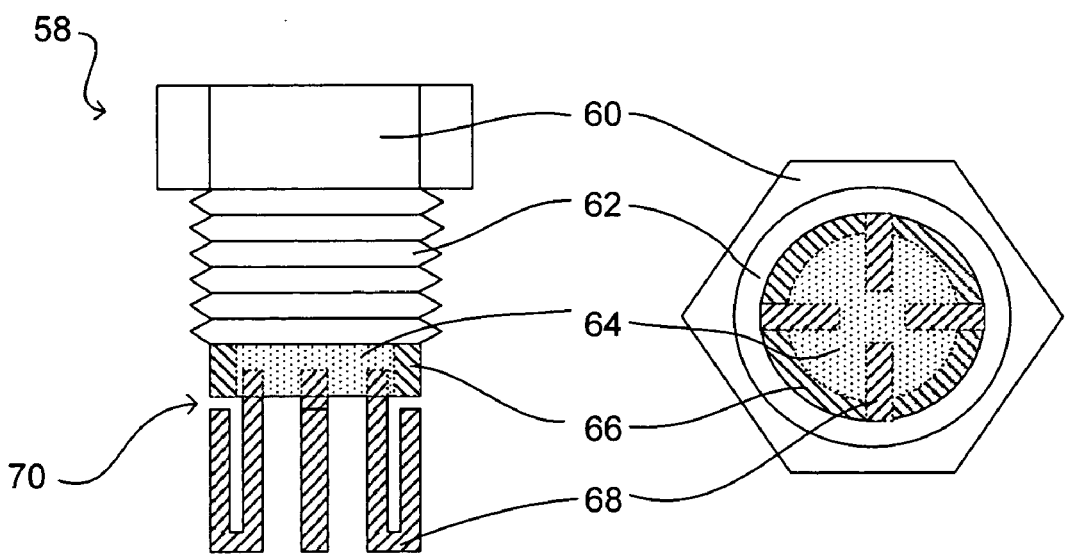
FIGS. 10a, 10b, 11a, and 11b depict embodiments of wireless spark plugs that can be used within a cylinder of an intermittent combustion engine that requires a spark.

In FIGS. 10a and 10b, an embodiment of a wireless spark plug 58 is shown that can be used in a gasoline-type or other engine system requiring a spark, though such a use is not required. In this embodiment, a nut 60 is present that can be used to insert or remove the spark plug from an engine cylinder. Threads 62 are present that function similarly as a conventional spark plug. An insulator 64 can be present that is electrically non-conductive and can be fabricated from a substance such as a ceramic or other suitable material capable of withstanding very high temperatures. In this embodiment, a ground ring 66 comprising a metallic material is positioned across, but separated by a small gap 70, from several antennas which form an array of antennas 68. The antennas 68 are looped such that a terminal end of each antenna is positioned near the ground ring 66 forming the gap 70.

The wire antennas can be used to collect electromagnetic wave energy to generate a spark, similar to conventional spark plugs, but without the additional requirement of hard wiring the spark plugs to a power source. By selecting an electromagnetic wave frequency that is essentially transparent to a fuel vapor (whether conditioned according to the present invention or not) a spark can be created that serves to ignite vaporized gasoline. Such a design would be advantageous over other electromagnetic wave sparking systems because the spark would be stable with respect to location and intensity. Additionally, by removing the need for hard wiring of the spark plug, smaller wireless spark plugs can be formed that are less complicated with respect to wiring. This creates the possibility of including more spark plugs in a single combustion chamber, thereby increasing the ability for more rapid and more complete combustion.

Figures 11A, 11B:
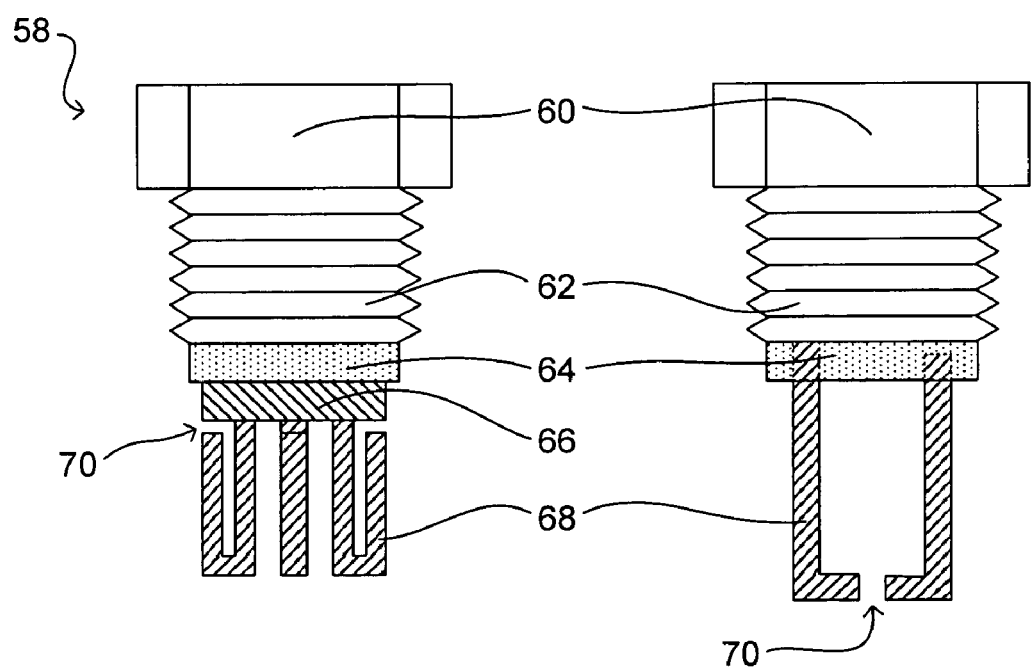

FIGS. 11a and 11b depict two alternative embodiments of wireless spark plugs. In FIG. 11a, the ground ring 66 is positioned such that a portion is exterior to the insulator 64. Though an insulator 64 is shown in this embodiment, it is not required. In other words, the threaded portion 62 and the ground ring 66 can be directly connected to one another. In FIG. 11b, there is no ground ring as a pair of antennae 68 are configured such that terminal ends of each antenna are in close proximity, forming the appropriate spark gap 70. Such a design can be advantageous because the spark generated by the two antennae 68 can be nearer to the center of the combustion chamber. This can aid in more complete and more rapid combustion of the fuel, as the point of ignition can be closer to the center of the fuel mass rather than near the point where the plug enters the cylinder. Such a design can also be advantageous in that the lengths of the antenna 68 could be selected so as to maximize the efficiency between the location of the spark relative to the cylinder and the magnitude of the spark as determined by the length of the antenna and the wavelength of the electromagnetic waves. As shown, one of the two wire antenna 68 can be connected to the insulator 64 and the other is connected to a conductive threaded portion 62. By configuring the wireless spark plug in this way, one of the two antennae can be energized in a different mode than the other. In other words, one of the two antennae can have a voltage maximum at or near the gap, and the other will not have a voltage maximum. Thus, a voltage difference between the two antennae 68 at the gap 70 will more readily aid in the creation of a spark.

The principle of a wireless spark plug can be based on a simple resonant wire antenna. When used in the present invention, the antenna receives an electromagnetic wave having a wavelength according to the following formulas:

$$L = m\lambda 2$$

m=1, 2, 3, 4, 5, etc.
(FIGS. 10a, 10b, and 11b)

$$L = \lambda(1/4 + n/2)$$

n=0, 1, 2, 3, 4, 5, etc.
(FIG. 11a)

where L is the electrical length of the wire antenna (straight or bent as is known by those skilled in the art), λ is the wavelength, and m, n are integers of specified range. Such combination results in the formation of a standing wave, which is always maximum at the gap end of the antenna. In one embodiment, the gap end of the antenna is where the impedance is at its highest because the gap end of the antenna is insulated, and the current is correspondingly at a minimum at the gap end of the antenna.

The wireless spark plug utilizes these characteristics of a receiving antenna by using a various receiving antenna configurations to generate enough voltage differential to create a spark. For example, the antenna receiving device can be looped and terminated near a grounding device such as a ground ring. Alternatively, the antenna receiving device can be a pair of metal antenna that are positioned in close proximity at the gap, one being insulated and the other being directly connected to a grounded conductive portion of the spark plug. Regardless of the structure used, the energy source must be configured such that a spark can be created at the gap by emitting microwave or other electromagnetic energy waves into a combustion chamber, effectuating an ignition of a vaporized gasoline.

If the receiving device used is an insulated antenna, then the antenna can be configured in combination with an electrical conductor at a low voltage. The antenna terminates in one end at a point very close to, but not in contact with, the grounded conductor. The resulting small gap between the antenna and the ground serves as a spark gap. As the voltage at the end of the antenna reaches a sufficiently high voltage in relation to the ground voltage a spark is created in the spark gap. The spark then serves as the ignition source for the fuel in a cylinder of a reciprocating internal combustion engine.

Figure 12:
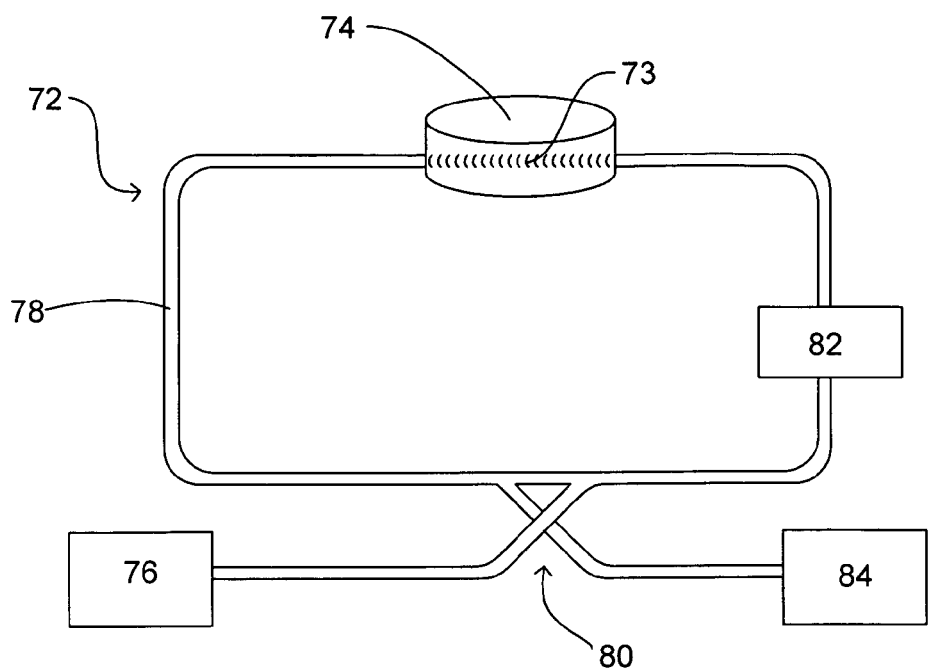
FIGS. 12 and 13 show a schematic representation of an alternate system of fuel conditioning utilizing a traveling wave resonator.

FIG. 12 shows an alternate system for introducing electromagnetic waves to a fuel conditioning chamber in a reciprocating internal combustion engine. Shown generally at 72 is a traveling wave resonator system configured to create a resonant wave 73 inside an applicator chamber or fuel conditioning cavity 74. Resonance is achieved in the applicator chamber 74 when the frequency of the circulating wave produced by an electromagnetic wave generator 76 is an integer multiple of the fundamental resonant frequency of the resonant ring 78. A phase changer 82 adjusts the phase of the traveling wave until resonance is achieved. A directional coupler 80 routes energy from the generator 76 to either the phase changer 82 or a dummy load 84. When the resonant ring 78 requires supplemental energy, the directional coupler 80 allows additional energy to enter the ring 78. When the ring does not require supplemental energy, the directional coupler 80 allows the energy from the generator 76 to drain into the dummy load 84.

Figure 13:
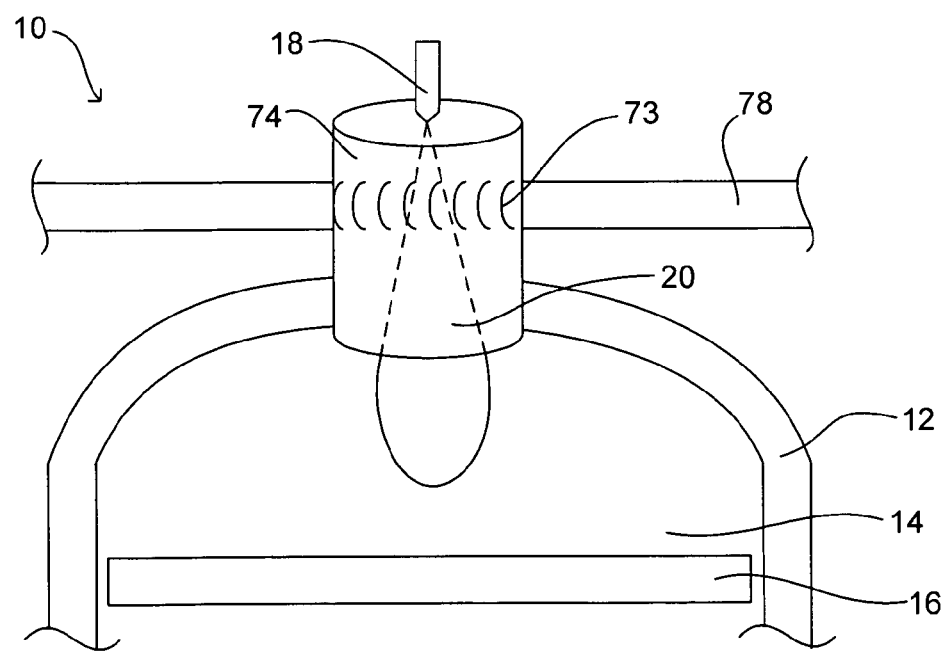

FIG. 13 provides a more detailed view of the applicator chamber 74 shown in FIG. 12. Shown generally at 10 is a fuel conditioning system for use in an intermittent combustion engine. The fuel conditioning system 10 is generally comprised of a combustion chamber wall 12 defining a combustion chamber 14, and a piston head 16. A fuel injector 18 is also shown as well as a fuel spray 20, which is present in the cylinder in conjunction with the cyclic movement of the piston head, as is known by those skilled in the art. In this embodiment, the fuel spray 20 can pass through the applicator chamber or fuel conditioning cavity 74 prior to entering the combustion chamber 14. The resonant wave 73 in the applicator chamber 74 is created such that the frequency of the resonant wave 73 is within a range sufficient to effectuate enough molecular rotational and/or vibrational absorption to promote volumetric heating of the fuel spray 20.

The present embodiment is advantageous because the wavelength of the electromagnetic wave can be chosen based on the molecular resonance of the fuel, without consideration of the physical size and shape of the applicator chamber. Because the chamber resonance is achieved by adjusting the phase shifter, resonance can be achieved with any frequency of electromagnetic wave, regardless of the size or shape of the chamber. This freedom of choice of wavelengths allows for greater freedom in designing the applicator chamber and maximizing the efficiency of the system.

Turning to a more general discussion of the embodiments shown herein, and to equivalent embodiments, many variables can be altered, depending on the application need. For example, electromagnetic energy wavelength or frequency can be an important consideration for a specific application. To illustrate, a conventional microwave oven is operable at a typical frequency of 2.45 GHz, which provides functionality for heating lightly ionized bound water found in most food items. It is known that cooking oil and other hydrocarbons with no moisture content are transparent to the microwaves within this frequency range. To vaporize gasoline or diesel fuel, or nearly any hydrocarbon that contains no water, strategies includes either mixing the fuel with lightly ionized moisture or choosing a different frequency range. The introduction of additional moisture into the engine combustion chamber is undesirable for various reasons.

For engine fuel typically used in intermittent combustions engines, such as reciprocating internal combustion engines, it can be more practical to choose electromagnetic wave frequencies that can be absorbed by the fuel efficiently. Though any functional frequency is contemplated in accordance with the present invention in any of the previously described embodiments, it is preferred that a frequency from about 3 Giga Hertz (GHz) to 3 Peta Hertz (PHz) be used. Such a frequency range has corresponding wavelength of 0.1 μm to 10 cm, which is sufficiently large compared to fuel spray droplets which are typically of a diameter of 120 microns or less. In more preferred embodiments, wavelengths from about 0.4 μm to about 2 mm can also be used. Such wavelengths can allow for rapid vaporization of the spray droplets by volumetric heating, as opposed to the current means of vaporization by heat conduction and convection which vaporizes only the surface of the fuel droplets. In one embodiment, a preferred wavelength to enhance rapid spray droplet vaporization of a typical hydrocarbon-based fuel can be within the infrared region, which is from 0.7 μm to 12 μm. In another embodiment, the wavelength range can be from 3 μm to 4 μm, or can be from 9 μm to 12 μm, depending on the fuel choice and/or cavity/combustion chamber configuration.

To illustrate an embodiment where a choice of fuel can be matched to a wavelength for good volumetric heating, one can consider the use of energy having a wavelength from 8 μm to 12 μm in the far-infrared region. For improved volumetric heating, one can include a volumetric heating enhancer, such as an alcohol, in the fuel (or as the fuel itself). Examples include methanol and/or ethanol, and any of a number of other alcohols or other hydrocarbons as would be known to those skilled in the art to absorb in this range. 2-methoxy-2-methyl propane is another example of a well known fuel additive that is currently sold as an octane booster for gasoline, and will absorb energy at about a 10 μm energy wavelength. In one embodiment, a primary fuel, such as gasoline or diesel fuel, can be mixed with an energy absorbing enhancer at a functional ratio. For example, methanol, ethanol, and/or other enhancer known to absorb energy having a wavelength from about 9 μm to 11 μm can be used alone, or the enhancer can be added to the primary fuel. Functional ratios of the primary fuel, e.g., diesel or gasoline, to the enhancer can be from 100% enhancer component to 0.0001% (1 ppm) enhancer component, either by weight or volume. The 8 μm to 12 μm wavelength range is provided by way of example because such wavelengths can be generated easily by a $CO_2$ laser, which is widely commercially available. Any wavelength described herein can be used, provided the wavelength is functional for volumetric heating of the fuel used, whether the fuel is modified or not.

To illustrate another embodiment, the electromagnetic wave source can also be configured to introduce multiple electromagnetic wave frequencies to the fuel conditioning cavity. It has been observed that infrared absorption-wavelength spectra of methane, ethane, propane, butane, octane, hexadecane, and ethanol, and the like, show high energy absorption at wavelengths from about 3 μm to 4 μm. It is believed that the carbon-hydrogen bond at this wavelength can create volumetric heating by molecular vibrational energy absorption.

Where the electromagnetic energy waves are in the infrared region, optical material such as glass and silica becomes opaque. Therefore, it can be advantageous to utilize calcium flouride ($CaF_2$) to construct an optical component, which can act as a lens. It is contemplated that upon further advancements of optical technology, the modifications of such optics could be incorporated into this invention, including the use of light sources capable of directly generating 3.5 μm waves, for example.

In order to effectuate the volumetric vaporization of the fuel, the electromagnetic energy wavelength or frequency can be matched with a molecular resonant wavelength of the fuel. Such resonant frequency can be matched such that vibrational and/or rotational molecular resonant absorption occur(s). Though the ideal is to use a resonant frequency as described, any degree of either vibrational or rotational resonance that is functional for providing volumetric conditioning or vaporization to any degree is within the scope of the present invention.

Regarding any of the above figures, or other embodiments described herein, or equivalent structures or methods, fuels for which these technologies can be used include gasolines, diesel fuels, oils, alcohols, biodiesels, other alternative fuels, modified fuels, fuel mixtures, and the like. However, there is a great need that has been recognized in the areas of gasoline and diesel fuel engines. Additionally, though all of the figures depict walls that are curved, this is not required in all embodiments. For example, one skilled in the art in possession of the present disclosure would recognize that non-curved walls could be used in some embodiments, including the use of planar and/or polygonal walls. Further, though the preferred embodiment typically promotes volumetric heating through obtaining molecular resonance, this is not necessarily the only heating mechanism.

With this in mind, the present invention as previously described in any of above embodiments can be drawn to fuel conditioning systems for delivering fuel to a cylinder of an intermittent combustion engine, where the fuel is delivered with either direct fuel injection systems or indirect fuel injection systems. The present invention also discloses methods of conditioning fuel for use in an internal combustion engine. These inventions are unified by the use of electromagnetic energy to condition fuel in intermittent combustion engines, increasing ignition energy, and generate sparks with respect to gasoline engines. By utilizing electromagnetic wave energy to condition or volumetrically heat the fuel prior to ignition, a more complete vaporization can result. For example, in a conventional fuel combustion process, liquid fuel is heated from the surface to the center by conduction and convection. Thus, the exterior of the fuel droplet vaporizes before the interior of the liquid fuel droplet. The vaporized portion will then be rapidly combusted and the liquid center merely slowly burns. This slow burn of the center of the liquid fuel droplet results in incomplete combustion. Thus, a portion of the fuel droplet is sent out of the combustion chamber as soot rather than as desired exhaust, leading to soot build up and more undesirable emissions. Conversely, under the right conditions, electromagnetic waves can be used to heat fuel throughout its volume (both inside and out), as opposed to merely heating the surface or skin and relying on heat conduction and convection to heat the inside of the fuel volume. In other words, by utilizing electromagnetic wave energy to heat the fuel droplet prior to ignition, the outer surface of the droplet can be heated simultaneously with the center of the droplet. As a result, no liquid center of the fuel droplet remains to slowly burn. Rather, the entire fuel droplet is vaporized volumetrically, and the entire vaporized droplet can be substantially completely combusted. One of the conditions that can be implemented to heat the fuel throughout its volume is to provide a fuel droplet that is comparable or smaller than the wavelength of the electromagnetic wave used. To illustrate, a typical fuel spray contains fuel droplets of about 50 μm in diameter, which is comparable to a wavelength of infrared. Thus, in another embodiment, electromagnetic energy of approximately 3 to 300 THz can generate volume heating as described above.

The previously described embodiments, and equivalents thereof, may sufficiently transfer energy to the fuel with a single pass of electromagnetic energy. Thus, a fuel conditioning system may optionally not contain a separate fuel conditioning cavity apart from the combustion chamber. If, for example, microwave energy is used, then the electromagnetic wave source can be coupled to the fuel conditioning cavity by a waveguide. Specifically, the waveguide can have a terminal interface having a plug that is essentially invisible to microwave energy and acts to maintain pressure in the cylinder. A suitable material for such a plug is any ceramic material that is invisible to the microwave energy, and is capable of withstanding the pressure and heat generated in a cylinder of an internal combustion engine. Particularly, with respect to diesel engines where very high pressures are present, such a plug would be desired. If the thickness of the ceramic plug is equal to one-half wavelength or one half wavelength plus an integer multiple of one wavelength (e.g., $\lambda/2+n\lambda$, n=0, 1, 2, 3, ..., where $\lambda$ is one wavelength), then the electromagnetic waves will merely pass through the plug with no reflection. In one embodiment, the plug can be configured such that the walls taper away from the cylinder. Thus, if the waveguide at a terminal end is configured like a horn antenna, any positive pressure generated in the cylinder would wedge the plug against the walls of the horn, thereby preventing slippage of the plug into the waveguide.

In a gasoline engine, the internal condition of the chamber at the moment of ignition is typically at a pressure of from 3 to 5 atmosphere (atm) and a temperature of from 200° C. to 300° C. In a diesel engine, conditions can be as much as 10 atm and from 300° C. to 500° C. Typical microwave generators, such as magnetrons and semiconductor devices, and typical waveguides are not designed to withstand such conditions. Thus, the use of the plug as previously described can alleviate some of this incompatibility. Though this embodiment is described with respect to microwave energy, it is understood that other energy types can also be used similarly.

The fuel conditioning system can additionally be used in non-reciprocating engines, where the combustion is continuous rather than intermittent. Examples of non-reciprocating engines that may be designed to incorporate a fuel conditioning system embodied by the present invention are jet engines, gas turbine engines, and furnaces. These examples operate in a steady state by continuous combustion, thus, the fuel conditioning system of the instant invention could be incorporated to vaporize fuel without igniting to allow for cleaner burning.

As stated previously, the present invention can be made to be applicable with respect to both gasoline and diesel engines, as well as other engines. If a gasoline engine is used, then an additional spark source is required. The spark source can be a conventional spark plug or a wireless spark plug as described herein.

In either embodiment (self-igniting or spark igniting), the fuel conditioning cavity can be in the form of a geometric sleeve (e.g., cylindrical, square, rectangular, polygonal, etc.) that protrudes into the combustion chamber (as shown in FIGS. 3a–c). Alternatively, the fuel conditioning cavity can be embedded in the wall of the cylinder (as shown in FIGS. 1 and 2a–b). This is a more desirable configuration as certain advantages can be realized with such a design. For example, because the temperature in a functioning combustion chamber is so high, the wall of the engine cylinder can be designed to act as a heat sink. Additionally, coolant could be circulated around the exterior of the cylinder, cooling the cylinder walls, and thus, cooling the walls of the fuel conditioning cavity. Regardless of the design used, the fuel conditioning cavity could be configured in a shape that promotes the effective creation of a standing wave. Additionally, the walls of the fuel conditioning cavity should be reflective with respect to the electromagnetic waves which are used to condition the fuel.

In the embodiments described previously, the fuel conditioning cavity can be separated from the combustion chamber by a valve allowing the fuel conditioning cavity to be separated from the combustion chamber serves to enhance fuel drop volumetric heating or vaporization. The enhanced vaporization can also be substantially complete prior to transfer into the combustion chamber. The valve serves to operate as an intermittent opening, which intermittently fluidly couples the fuel conditioning cavity with the combustion chamber.

It is also contemplated that in all previously described embodiments, air vents may be used to fluidly connect the fuel conditioning cavity with the combustion chamber to facilitate the mixing of air with the fuel spray. Additionally, the fuel conditioning cavity can be fluidly coupled to the combustion chamber without air vents, and optionally can be made to be removable, e.g., by providing screw threads as shown in FIG. 2a. This would be advantageous if the fuel conditioning cavity were to become damaged, or for any other reason. In such a circumstance, the fuel conditioning cavity portion could be replaced without replacing the entire combustion chamber or the air intake manifold. As the fuel conditioning cavity is not strictly required in all of the embodiments provided, structures other than the fuel conditioning cavity can also be made to be removable. For example, the electromagnetic wave source can be removable.

A method for conditioning fuel for use in a intermittent combustion engine is also disclosed that can utilize the any of the illustrated structures, or equivalent structures. The method comprises the steps of injecting fuel into a fuel conditioning cavity defined by walls within a intermittent internal combustion engine; and emitting electromagnetic waves into the fuel conditioning cavity and reflecting the electromagnetic waves from the cavity walls into the fuel spray to cause molecular vibrational resonant absorption with respect to the fuel spray. The method for conditioning fuel can further comprising the step of correlating an electromagnetic wavelength, a fuel conditioning cavity dimension, and a fuel resonant frequency such that an electromagnetic standing wave is formable that effectuates volumetric heating of the fuel spray droplet. Alternatively, the method for conditioning fuel optionally provides a fuel conditioning cavity at least partially defining the fuel conditioning cavity by an optical mirror, thereby providing a surface such that reflected electromagnetic waves, once introduced into the fuel conditioning cavity, are reflected through the fuel spray. The step of introducing electromagnetic waves can comprise the use of electromagnetic waves from 0.1 μm to 10 cm in wavelength. In one embodiment, the introduced electromagnetic waves can be in the infrared region. In another embodiment, the electromagnetic waves can be from 3 μm to 4 μm in wavelength. In yet another embodiment, the electromagnetic waves can be from 9 μm to 12 μm in wavelength. In the two latter embodiments, the electromagnetic waves can be introduced by a periodically poled lithium niobate device, or a $CO_2$ laser device, respectively. The method for conditioning fuel can be operated within a reciprocating internal combustion engine can be by a direct fuel injection system or an indirect fuel injection system, a.k.a. intake port injection system. In an alternative method, steps can include injecting liquid fuel into a fuel conditioning cavity to form a fuel spray; emitting electromagnetic energy into the fuel conditioning cavity; and reflecting the electromagnetic energy from a reflective surface, wherein the electromagnetic energy becomes focused at the fuel spray.

It is to be understood that the above-referenced arrangements are illustrative of the application for the principles of the present invention. Numerous modifications and alternative arrangements can be devised without departing from the spirit and scope of the present invention while the present invention has been shown in the drawings and described above in connection with the exemplary embodiments(s) of the invention. It will be apparent to those of ordinary skill in the art that numerous modifications can be made without departing from the principles and concepts of the invention as set forth in the claims.

What is claimed is:

1. A fuel conditioning system for conditioning fuel within a combustion chamber of an intermittent internal combustion engine, comprising:
   (a) a fuel conditioning cavity defined by walls, wherein at least a portion of said walls include a reflective inner surface,
   (b) an electromagnetic energy source operable for emitting electromagnetic energy within the fuel conditioning cavity, said electromagnetic energy source configured to emit and reflect the electromagnetic energy from the reflective inner surface, thereby providing focused electromagnetic energy;
   (c) a discrete region disposed within the fuel conditioning cavity for receiving the focused electromagnetic energy; and
   (d) a fuel injector having a dispensing end being oriented for dispensing a fuel spray with a trajectory through the focused electromagnetic energy.

2. A fuel conditioning system according to claim 1, wherein the focused electromagnetic energy passes through the fuel spray at a plurality of locations within the discrete region.

3. A fuel conditioning system according to claim 1, wherein the electromagnetic energy source introduces the electromagnetic energy into the fuel conditioning cavity via a periodically poled lithium niobate device.

4. A fuel conditioning system according to claim 1, wherein at least one of said walls comprises an optical mirror.

5. A fuel conditions system according to claim 1, wherein the fuel conditioning cavity is the combustion chamber.

6. A fuel conditioning system according to claim 1, wherein the fuel injector operates as a direct fuel injection system.

7. A fuel conditioning system according to claim 1, wherein the fuel injector operates as an indirect fuel injection system.

8. A fuel conditioning system according to claim 1, wherein the electromagnetic energy source introduces multiple electromagnetic wave frequencies to the fuel conditioning cavity.

9. A fuel conditioning system according to claim 1, wherein the reflective inner surface comprises a parabola.

10. A fuel conditioning system according to claim 9, wherein the discrete region is substantially located at a focal region of the parabola.

11. A fuel conditioning system according to claim 1, wherein the electromagnetic energy source is disposed along at least one of said walls within the fuel conditioning cavity.

12. A fuel conditioning system according to claim 11, further comprising a plurality of electromagnetic energy sources disposed along at least one of said walls within the fuel conditioning cavity.

13. A fuel conditioning system according to claim 1, wherein the fuel conditioning cavity is substantially cylindrical.

14. A fuel conditioning system according to claim 13, wherein the discrete region is disposed along a center axis of the cylinder.

15. A fuel conditioning system according to claim 1, wherein the electromagnetic energy comprises electromagnetic waves that are from 0.4 μm to 2 mm in wavelength.

16. A fuel conditioning system according to claim 15, wherein the electromagnetic energy comprises electromagnetic waves within the infrared spectrum.

17. A fuel conditioning system according to claim 15, wherein the electromagnetic energy comprises electromagnetic waves within the visible light spectrum.

18. A fuel conditioning system according to claim 1, wherein the fuel conditioning cavity has an elliptical cross-section.

19. A fuel conditioning system according to claim 18, wherein the elliptical cross-section is a mathematical ellipse having two focal points, and wherein the fuel conditioning cavity comprises two focal axes that pass through the two focal points of the cross-section.

20. A fuel conditioning system according to claim 19, wherein the electromagnetic energy source is disposed along a first axis of the two focal axes, and the discrete region is disposed along a second axis of the two focal axes.

21. A fuel conditioning system for conditioning fuel within a combustion chamber of an intermittent internal combustion engine, comprising:
   (a) a fuel conditioning cavity defined by walls, wherein at least a portion of said walls include a reflective inner surface,
   (b) an electromagnetic energy source operable for emitting electromagnetic energy having wavelengths from 0.4 μm to 2 mm within the fuel conditioning cavity, said electromagnetic energy source configured to emit and reflect the electromagnetic energy from the reflective inner surface, thereby forming reflected energy;
   (c) a discrete region disposed within the fuel conditioning cavity for receiving the reflected energy at a greater concentration than in other regions within the fuel conditioning cavity; and
   (d) a fuel injector having a dispensing end being oriented for dispensing a fuel spray with a trajectory through the discrete region.

22. A fuel conditioning system according to claim 21, wherein the fuel conditioning cavity has an elliptical cross-section.

23. A fuel conditioning system according to claim 21, wherein the reflective inner surface comprises a parabola.

24. A fuel conditioning system according to claim 21, wherein the electromagnetic energy source is disposed along at least one of said walls within the fuel conditioning cavity.

25. A fuel conditioning system according to claim 21, wherein at least one of said walls comprises an optical mirror.

26. A fuel conditions system according to claim 21, wherein the fuel conditioning cavity is the combustion chamber.

27. A fuel conditioning system according to claim 21, wherein the electromagnetic energy is focused within the discrete region.

28. A fuel conditioning system according to claim 21, wherein the electromagnetic energy comprises electromagnetic waves that are within the infrared or visible light spectrum.

29. A fuel conditioning system according to claim 21, wherein the fuel injector operates as a direct fuel injection system.

30. A fuel conditioning system according to claim 21, wherein the fuel injector operates as an indirect fuel injection system.

31. A fuel conditioning system according to claim 21, wherein the electromagnetic energy source introduces multiple electromagnetic wave frequencies to the fuel conditioning cavity.

32. A fuel conditioning system according to claim 21, wherein the fuel conditioning cavity is substantially cylindrical.

33. A fuel conditioning system according to claim 32, wherein the discrete region is disposed along a center axis of the cylinder.

34. A fuel conditioning system for conditioning fuel within a combustion chamber of an intermittent internal combustion engine, comprising:
(a) a combustion chamber defining a combustion region;
(b) a fuel conditioning region within the combustion region, and having a volume size that is less than that of the combustion region;
(c) a fuel injector configured to eject a fuel spray along a trajectory through the fuel conditioning region; and
(d) an electromagnetic energy source configured to introduce focused electromagnetic energy into the fuel conditioning region.

35. A fuel conditioning system according to claim 34, wherein the electromagnetic energy comprises electromagnetic waves that are within the infrared or visible light spectrum.

36. A fuel conditioning system according to claim 34, wherein the fuel injector operates as a direct fuel injection system.

37. A fuel conditioning system according to claim 34, wherein the fuel injector operates as an indirect fuel injection system.

38. A fuel conditioning system according to claim 34, wherein the focused electromagnetic energy results from a reflection from a reflective inner surface that at least partially defines the combustion chamber.

39. A fuel conditioning system according to claim 38, wherein the reflective inner surface comprises a parabola.

40. A fuel conditioning system according to claim 39, wherein the reflective inner surface comprises an optical mirror.

41. A method for conditioning fuel for use in an intermittent combustion engine, comprising:
(a) injecting liquid fuel into a fuel conditioning cavity to form a fuel spray; and
(b) emitting electromagnetic energy into the fuel conditioning cavity;
(c) reflecting the electromagnetic energy from a reflective surface, wherein the electromagnetic energy becomes focused at the fuel spray.

42. A method according to claim 41, wherein the reflective surface comprises a parabola.

43. A method according to claim 41, wherein the fuel conditioning cavity is substantially cylindrical.

44. A method according to claim 41, wherein the reflective surface comprises an optical mirror.

45. A method according to claim 41, wherein the fuel conditioning cavity is a combustion chamber.

46. A method according to claim 41, wherein the electromagnetic energy comprises electromagnetic waves that are within the infrared or visible light spectrum.

47. A method according to claim 41, wherein the fuel injector operates as a direct fuel injection system.

48. A method according to claim 41, wherein the fuel injector operates as an indirect fuel injection system.

49. A method according to claim 41, wherein the reflective surface is provided by at least one wall that at least partially defines the fuel conditioning cavity.

50. A method according to claim 49, wherein the fuel conditioning cavity has an elliptical cross-section.

* * * * *